United States Patent [19]

Darringer et al.

[11] 4,064,827
[45] Dec. 27, 1977

[54] TEMPERATURE INDICATING DEVICE

[75] Inventors: Richard E. Darringer, Fullerton; Robert J. Wrighton, San Gabriel, both of Calif.

[73] Assignee: Telatemp Corporation, Fullerton, Calif.

[21] Appl. No.: 716,069

[22] Filed: Aug. 19, 1976

[51] Int. Cl.² ............................................. A01K 5/70
[52] U.S. Cl. ............................... 116/114 Y; 73/378.3; 116/114.5
[58] Field of Search ......................... 116/114.5, 114 Y; 73/378.3; 337/342, 380, 376

[56] References Cited
U.S. PATENT DOCUMENTS

| | | | |
|---|---|---|---|
| 1,682,498 | 8/1928 | Gano | 116/114.5 X |
| 2,046,186 | 6/1936 | Saul | 116/114.5 |
| 2,349,008 | 5/1944 | Sauter | 73/378.3 X |
| 3,290,942 | 12/1966 | Carbaugh et al. | 116/114.5 X |
| 3,483,748 | 12/1969 | Rogen et al. | 116/114.5 X |
| 3,622,932 | 11/1971 | Cunarelis | 337/376 |

Primary Examiner—Daniel M. Yasich
Attorney, Agent, or Firm—Edward D. O'Brian

[57] ABSTRACT

A temperature indicating device for use in indicating when the temperature of the device has been changed to a predetermined temperature can be constructed so as to utilize a snap spring such as a bimetal bowed washer capable of rapidly changing from a first configuration to a second configuration when the temperature of the spring is changed to a predetermined temperature. In a device of the invention the spring is located within an internal cavity of a housing in such a manner as to hold an indicator member within the housing so that it is visible from the exterior of the housing when the spring is in the first configuration. When the temperature of the spring is changed so as to cause the spring to go to the second configuration the indicator member is released so as to be free to fall within the cavity to a position in which it is no longer visible. If desired the indicator member may be coated with a coating indicating a specific temperature other than the predetermined temperature.

12 Claims, 5 Drawing Figures

U.S. Patent  Dec. 27, 1977  4,064,827
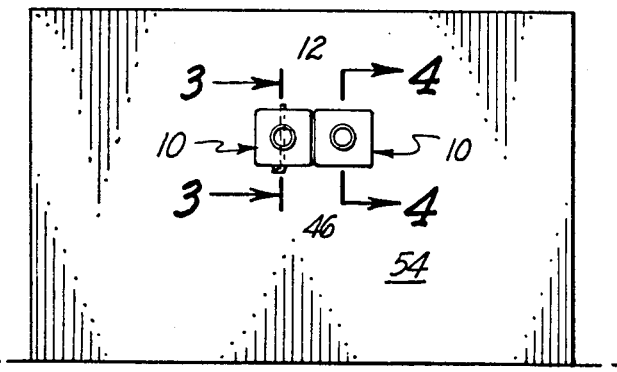
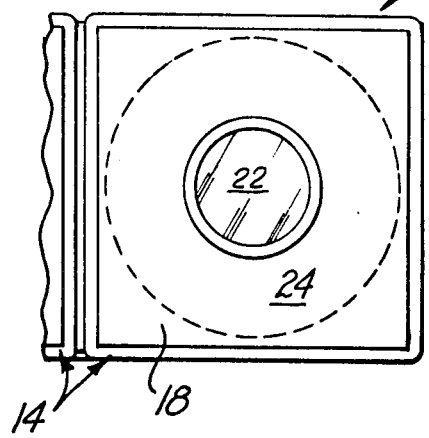
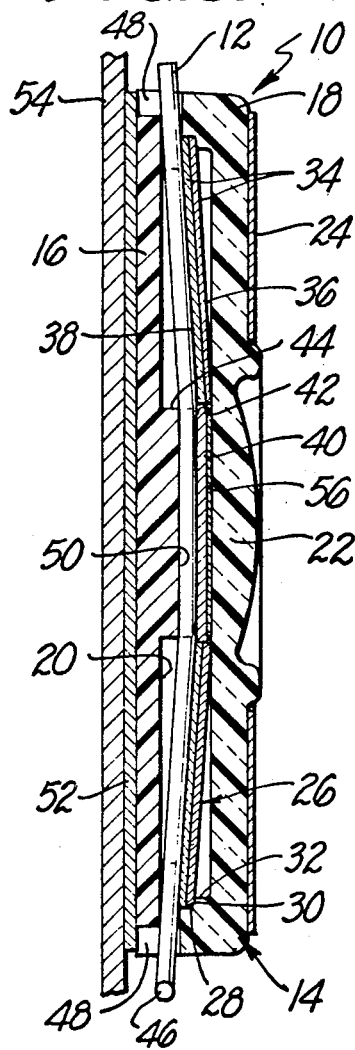
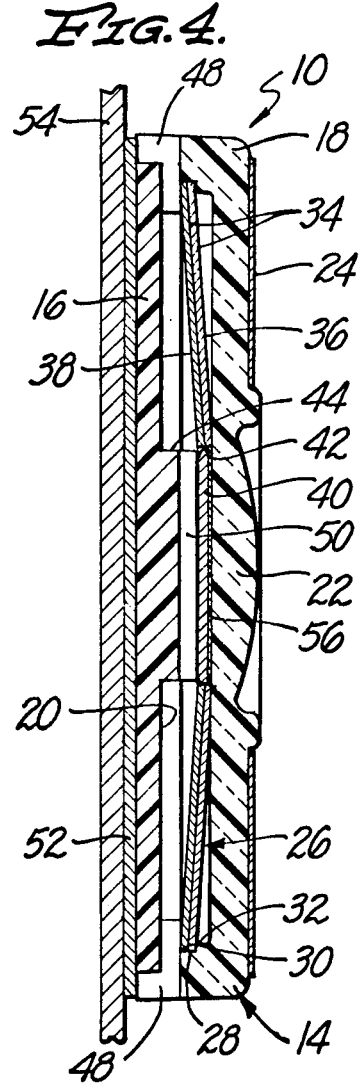
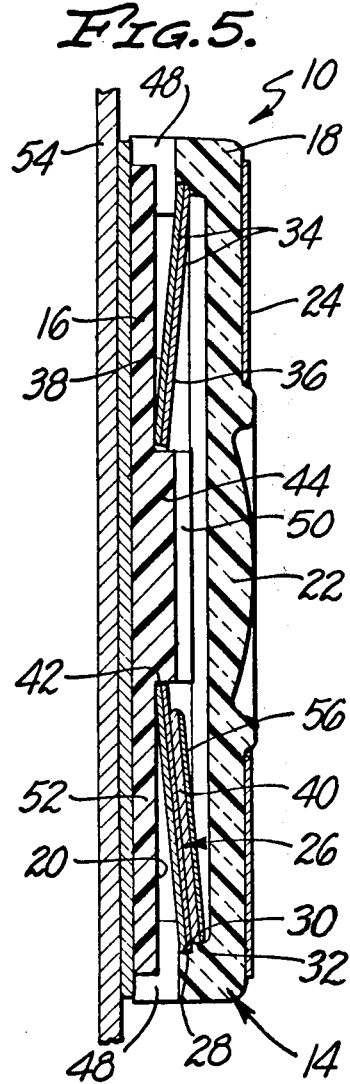

TEMPERATURE INDICATING DEVICE

BACKGROUND OF THE INVENTION

The invention set forth in this specification pertains to new and improved temperature indicating devices. More specifically it pertains to devices of this type which are utilized in indicating whether or not the device has been exposed to a predetermined temperature.

Devices of this type are employed in a wide variety of diverse applications so as to indicate whether or not something has been heated to or cooled to a predetermined temperature and so that this can be determined regardless of the temperature at the time a device of this type is inspected. These devices are not thermometers, but are more in the nature of recording structures designed to record whether or not specific temperatures have been achieved. Devices as are indicated may be utilized in determining whether or not a shipment of a temperature sensitive material has been heated to an undesired extent or has been cooled to an undesired extent during shipment from one location to another and/or during storage.

In the past a number of different methods have been employed for indicating whether or not certain specific temperatures have been achieved or reached. Devices such as known specialized types of recording thermometers and the like are considered to be undesirably expensive for use in determining the temperature "history" of a specific item or commodity. In some applications it is considered undesirable to utilize various types of coatings which change in color because of either a chemical reaction or a physical action caused by a temperature change. There are a number of reasons for this which are unimportant to an understanding of the present invention. These coatings which undergo a reversible color change are unusable for recording a past temperature after a return to an initial temperature. Coatings which undergo an irreversible color change can undergo such a change prior to being utilized in a desired application, and, of course, when this occurs they cannot be utilized for their intended purpose.

It is also known to utilize various different structures in which a temperature change causes a rapid or significant movement in a spring type bimetallic or similar element so as to indicate whether or not a specific temperature has or has not been developed. Some of these devices have been constructed in such a manner that a temperature change from an initial value to a predetermined value to be monitored is not indicated after the temperature of the device is changed back from the predetermined value to the initial value. Other of these devices are considered undesirable because of the amount of space occupied or required by the spring or spring element and/or the complexity of the spring element. Further, some of these devices are considered undesirable because they do not provide an easily observed indication as to whether or not they have been heated or cooled to a specific predetermined temperature. Certain of these devices are considered to be unnecessarily complex and expensive from a mechanical standpoint. Questions have also been raised as to the reliability of some of these devices. These latter factors are believed to be quite important. For a temperature indicating device to be commercially acceptable in a number of different applications, such a device must be simple enough so that it can be inexpensively produced on a mass production basis and must be highly reliable to the extent that there is virtually no chance of such a device not performing satisfactorily.

BRIEF SUMMARY OF THE INVENTION

It is believed that it will be apparent from the preceding that it is considered that there is a need for new and improved temperature indicating devices of the type described. A broad objective of the present invention is to fulfill this need. More specifically the invention is intended to provide temperature indicating devices which are primarily intended to indicate whether or not these devices have, depending upon the manner in which they are constructed, either been heated to or cooled to a specific predetermined temperature, regardless of the temperature of these devices at the time they are inspected. As subsequently indicated these devices may be, and preferably are, constructed so as to be capable of indicating several such predetermined temperatures.

An objective of the present invention is also to provide temperature indicating devices as briefly discussed in the preceding which can be manufactured at a comparatively nominal cost with a minimum of difficulty. A related object of the invention is to provide devices of this type which may be easily and conveniently installed in an operative location and which may be easily and conveniently inspected so as to determine a temperature indication or temperature history as described in the preceding discussion. A further object of the present invention is to provide temperature indicating devices which are constructed in such a manner that they are inoperative to indicate a temperature change until specifically actuated. A still further objective of the present invention is to provide temperature indicating devices which reliably and satisfactorily perform their intended function.

In accordance with this invention these various objectives are achieved by providing a temperature indicating device for use in indicating when the temperature of the device has been changed to a predetermined temperature which comprises: a housing having an internal cavity and window means for exposing an object located within the interior of the cavity to view from the exterior of the housing, snap spring means for rapidly changing from a first configuration to a second configuration when the temperature of the spring means is changed to the predetermined temperature, the spring means being located within the cavity, an indicator member located within the cavity, the spring means in the first configuration physically engaging the indicator member so as to hold the indicator member so that it is visible through the window means, the spring means in the second configuration being located so that the indicator member is not physically held by the spring means so as to be visible through the window means and is free to fall within the cavity so as to no longer be visible through the window means.

BRIEF DESCRIPTION OF THE DRAWING

The invention is best more fully explained with reference to the accompanying drawing in which:

FIG. 1 is a front elevational view showing two separate presently preferred temperature indicating devices of the invention adhered to an appropriate supporting surface, a first of these devices being shown as it appears prior to being rendered operative for its intended purpose, the second of these devices being shown in an operative configuration in which it is ready to be used;

FIG. 2 is a front elevational view at an enlarged scale of the second of these devices;

FIG. 3 is a partial cross-sectional view taken at line 3—3 of FIG. 1;

FIG. 4 is a partial cross-sectional view taken at line 4—4 of FIG. 1; and

FIG. 5 is a cross-sectional view corresponding to FIG. 4 indicating the configuration of one part and the location of another part after a temperature indicating device as shown in FIG. 4 has been changed to a predetermined temperature.

The temperature indicating devices illustrated in the drawing utilize certain operative concepts or principles as are set forth and defined in the appended claims. These concepts or principles may be easily embodied within a number of different somewhat differently constructed and/or appearing temperature indicating devices through the use or exercise of routine engineering skill.

DETAILED DESCRIPTION

In the drawing there are shown two identically constructed temperature indicating devices 10 in accordance with this invention. The device 10 illustrated at the left hand side of FIG. 1 and illustrated in FIG. 3 is identical to the device illustrated toward the right of FIG. 1 and in FIGS. 2, 4 and 5, except for the inclusion of a pin 12 in the device 10 toward the left in FIG. 1 and in FIG. 3.

A device 10 in accordance with this invention preferably utilizes a housing 14 formed so as to include a back 16 and a cover 18 secured to the back 16 so as to define an internal, generally disk-shaped cavity 20. Preferably the back 10 is formed of an opague material while the cover 18 is formed of a transparent material so that a center portion 22 of the cover 18 can be shaped more or less as a lens and so that this portion 22 can serve as a window enabling the interior of the cavity 20 to be viewed from the exterior of the housing 14.

Preferably a washer-shaped coating 24 such as an adhesively attached printed paper coating or a coating applied directly to the cover 18 is located on the cover 18 around the portion 22 so as to "set off" this portion 22 and so as to obscure the interior of the cavity 20 except in back of the portion 22. If desired an opening (not shown) serving as a window can be substituted for the portion 22. This, however, is not considered desirable because of the possibility of ambient conditions and/or handling ultimately resulting in mal-operation of the device 10.

A bimetal disk 26 is located within the cavity 20 so that its periphery 28 is held in a small groove 30 in the periphery 32 of the cavity 20. This disk 26 may be regarded as a type of a spring washer inasmuch as it is constructed so that a differential in temperature caused expansion of the metals in two different laminated layers 34 will cause this disk to change from a normal, first configuration as indicated in FIG. 4 of the drawing in which the disk 26 has a generally convex side 36 adjacent to the cover 18 and a generally concave side 38 adjacent to and facing the back 16 to a second configuration in which the side 36 becomes concave and the side 38 becomes convex as indicated in FIG. 5 of the drawing.

In moving between these two conditions the disk 26 passes through what may be regarded as being in the nature of an overcenter toggle position. The disk 26 used may either be stable in either of the two configurations illustrated or may be of such a character that after changing from one configuration to the other in response to a temperature change will revert to its original configuration upon a reversal of the temperature. Disks corresponding to the disk 26 are well known and are sometimes referred to as toggle springs and/or thermostat springs. Such disks have been utilized in various types of advertising and amusement devices. They have been employed in temperature indicating devices so as to produce an audible sound and to cause the deposition of a marking material.

This disk 26 is employed in the device 10 for the purpose of holding an indicating member 40 within the cavity 20 in position generally against the portion 22 of the cover 18 prior to the device 10 being rendered operative and being exposed to a temperature change which will cause a change in configuration of the disk 26. When the member 40 is held as described it is located in position in which it may be easily viewed from the exterior of the housing 14. Although the member 40 may be held in place in various different manners it is presently preferred to locate it in an operative position by loosely fitting it within an opening 42 in the center of the disk 26.

This opening 42 is centrally located within the disk 26. Because of the presence of this opening 42 the disk 26 may be referred to as a species or type of washer. This opening 42 is slightly larger than and is in alignment with a projection 44 extending into the cavity 20 from the back 16 of the housing 14. This projection 44 extends into the cavity 20 to a sufficient extent as to normally block the member 40 from moving along the side 38 of the disk 26.

This projection 44 is of such dimension as to project through this opening 42 when a change in temperature will cause a change in configuration of the disk 26 from a configuration as shown in FIG. 4 to a configuration as shown in FIG. 5. When this change in configuration occurs and when the device 10 is located vertically or substantially vertically the member 40 will be released and will fall through the action of gravity within the cavity 20 between the side 36 and the cover 18 so as to no longer be readily visible through the portion 22 of this cover 18. As the disk 26 changes in configuration the opening 42 will move toward the projection 44 and, if for any reason the member 40 does not automatically release, the mount of the disk 26 will bring the member 40 into contact with the projection 44 so that this projection 44 is engaged by the member 40 so as to dislodge the member 40 from the opening 42.

It is possible to determine by visual inspection of the device 10 whether or not the member 40 is in place within the opening 42 in the disk 26. Since the position of the member 40 indicates whether or not the disk 26 has reached the predetermined temperature at which it changes in configuration such inspection will indicate whether or not such temperature has been achieved. In order to facilitate such visual inspection it is preferred to have the surfaces of the member 40 and the projection 44 capable of being viewed of different, easily distinguished colors.

In order to guard against the disk 26 changing in configuration through temperature change occurring prior to the intended use of the device 10 it is preferred to incorporate or include within this device 10 a structure or means which will physically block the disk 26 from changing in configuration until it is ready to be utilized. In the device 10 the pin 12 serves this function. This pin 12 is provided with a bent over handle-like end 46 located on the exterior of the housing 14 and extends through openings 48 leading into the cavity 20 through the cavity 20 and along the groove 50 in the projection 44.

When this pin 12 is in position it extends adjacent to the side 38 of the disk 26 so as to physically hold the disk 26 against a change in configuration. When the device 10 is to be used the end 16 may be physically engaged and the pin 12 may be pulled from the housing 14 and discarded. The particular pin 12 illustrated is sufficiently resilient and deformable so as to be capable of being bent slightly as it is withdrawn from the housing 14. This resiliency is utilized in the device 10 to hold the pin 12 so that it will not be dislodged due to vibration.

In order to complete the device 10 it is considered preferable to locate upon the back 16 a layer 52 of an appropriate conventional adhesive which may be utilized in adhering the device 10 to an appropriate support 54 such as, for example, a vertical side of a packing case. Obviously the device 10 can be mounted in any convenient manner. Regardless of how the device 10 is mounted it should be located vertically so that the disk 26 can fall from view as indicated in the preceding discussion. However, it is possible to use the device 10 so that it is horizontal or nearly horizontal in cases where the device 10 and the support for the device 10 will be vibrated sufficiently to cause the member 40 to be moved from its initial position after the disk 26 changes in configuration and/or will be changed from such a horizontal position during handling.

It is possible to increase the utility of the device 10 by locating upon the member 40 a coating 56 in such a position that this coating will normally be visible through the portion 22 of the cover 18. The coating 56 used should be of a known type capable of changing color either permanently or reversibly (depending upon the application of the device 10) in response to a temperature change. In order to increase the utility of the device preferably the projection 44 and the housing 14 will be formed of a rigid material having a color which is distinctly different from the color of the coating 56 and from the color the coating 56 will assume upon a temperature change. If the coating 56 is not employed the projection 44 and the back 16 should preferably be of a different color from the member 40 in order to facilitate it being apparent that the member 40 is not in position adjacent to the portion 22.

Because of the nature of the construction of the device 10 it can be utilized in either monitoring whether or not this device has been heated to an elevated temperature from a normal or first temperature or cooled to a specific temperature below such a first temperature. In order to accomplish such variation appropriate variation must of course be made in the construction of the disk 26. At times it may be desirable to provide a wax or similar surface finish (not shown) on either the disk 26 or the side 36 of the disk 26, or both, in order to facilitate the disk 26 moving as this disk 26 achieves a specific predetermined temperature.

We claim:

1. A temperature indicating device for use in indicating when the temperature of said device has been changed to a predetermined temperature which comprises:

a housing having an internal cavity and window means for exposing an indicator member located within the interior of said cavity to view from the exterior of said housing, overcenter toggle spring means for changing from a first configuration to a second configuration by a snap action when the temperature of said spring means is changed to said predetermined temperature located within said cavity, an indicator member located within said cavity above the bottom of said cavity so as to be physically held by said spring means so as to be visible through said window means against movement when said spring means is in said first configuration, said spring means in said second configuration being located so that said indicator member is not physically held by said spring means and is free to fall within said cavity so as to no longer be visible through said window means, means for dislodging said indicator member from said spring means as said spring means moves from said first to said second configuration, said means for dislodging being located within said housing.

2. A temperature indicating device as claimed in claim 1 wherein:

said indicator member is provided with means for indicating that said device has reached a temperature other than said predetermined temperature, said temperature indicating means being located so as to be visible through said window means when said indicator member is engaged by said spring means so as to hold said indicator member so that it is visible through said window means.

3. A temperature indicating device as claimed in claim 1 including:

holding means for physically preventing said spring means from moving from said first configuration to said second configuration, said holding means engaging said spring means within the interior of said cavity and being capable of being moved so as to permit said spring means to change from said first to said second configuration.

4. A temperature indicating device as claimed in claim 1 wherein:

said window means comprises a transparent portion of said housing.

5. A temperature indicating device as claimed in claim 1 wherein:

said indicator member is provided with means for indicating that said device has reached a temperature other than said predetermined temperature, said temperature indicating means being located so as to be visible through said window means when said indicator member is engaged by said spring means so as to hold said indicator member so that it is visible through said window means, said window means comprises a transparent portion of said housing, and including holding means for physically preventing said spring means from moving from said first configuration to said second configuration, said holding means engaging said spring means within the interior of said cavity and being capable of being moved so as to permit said spring means to change from said first to said second configuration.

6. A temperature indicating device for use in indicating when the temperature of said device has been changed to a predetermined temperature which comprises:
- a housing having an internal cavity and window means for exposing an indicator member located within the interior of said cavity to view from the exterior of said housing,
- snap spring means for rapidly changing from a first configuration to a second configuration when the temperature of said spring means is changed to said predetermined temperature located within said cavity,
- an indicator member located within said cavity above the bottom of said cavity so as to be physically held by said spring means so as to be visible through said window means against movement when said spring means is in said first configuration,
- said spring means in said second configuration being located so that said indicator member is not physically held by said spring means and is free to fall within said cavity so as to no longer be visible through said window means, and
- holding means for physically preventing said spring means from moving from said first configuration to said second configuration, said holding means engaging said spring means within the interior of said cavity and being capable of being moved so as to permit said spring means to change from said first to said second configuration,
- said housing has an opening from the exterior thereof into said cavity,
- said holding means comprising a pin extending into said cavity from the exterior of said housing through an opening in said housing, said pin being capable of being physically removed from said housing so as to permit said spring means to change in configuration.

7. A temperature indicating device for use in indicating when the temperature of said device has been changed to a predetermined temperature which comprises:
- a housing having an internal cavity and window means for exposing an indicator member located within the interior of said cavity to view from the exterior of said housing,
- snap spring means for rapidly changing from a first configuration when the temperature of said spring means is changed to said predetermined temperature located within said cavity,
- an indicator member located within said cavity above the bottom of said cavity so as to be physically held by said spring means so as to be visible through said window means against movement when said spring means is in said first configuration.
- said spring means in said second configuration being located so that said indicator member is not physically held by said spring means and is free to fall within said cavity so as to no longer be visible through said window means,
- said indicator member including means for indicating that said device has reached a temperature other than said predetermined temperature, said temperature indicating means being located so as to be visible through said window means when said indicator member is engaged by said spring means so as to hold said indicator member so that it is visible through said window means,
- said window means comprises a transparent portion of said housing,
- and including
- holding means for physically preventing said spring means from moving from said first configuration to said second configuration, said holding means engaging said spring means within the interior of said cavity and being capable of being moved so as to permit said spring means to change from said first to said second configuration,
- said housing has an opening from the exterior thereof into said cavity,
- said holding means comprising a pin extending into said cavity from the exterior of said housing through an opening in said housing, said pin being capable of being physically removed from said housing so as to permit said spring means to change in configuration.

8. A temperature indicating device for use in indicating when the temperature of said device has been changed to a predetermined temperature which comprises:
- a housing having an internal disk-shaped cavity having first and second sides and a periphery and window means for exposing an indicator member located within the interior of said housing located adjacent to the center of said first of said sides of said cavity,
- snap spring means for rapidly changing from a first configuration to a second configuration when the temperature of said spring means is changed to said predetermined temperature located within said cavity,
- said spring means comprising a bimetal disk, the sides of which are located adjacent to the sides of said cavity and the sides of which change in configuration when said spring means is heated to said predetermined temperature,
- an indicator member located within said cavity above the bottom of said cavity so as to be physically held by said spring means so as to be visible through said window means against movement when said spring means is in said first configuration,
- said spring means in said first configuration holding said indicator member in proximity to said window means,
- said spring means in said second configuration being located so that said indicator member is not physically held by said spring means and is free to fall within said cavity so as to no longer be visible through said window means.

9. A temperature indicating device as claimed in claim 8 wherein:
- said disk has a hole located in the center thereof and extending between the sides of said disk,
- said indicator member is located adjacent to said hole in said disk when said spring means is in said first configuration,
- said housing includes a projection extending into said cavity from the center of said second side of said cavity, said projection being spaced from said hole in said disk when said spring is in said first position and extending through said hole in said disk when said spring is in said second position,
- said projection being capable of causing disengagement of said indicating member from said disk by passing through said hole in said disk when said disk changes from said first to said second configuration.

10. A temperature indicating device as claimed in claim 9 wherein:
said indicating member fits within the interior of said hole so as to be releasably held by said disk when said disk is in said first configuration.

11. A temperature indicating device as claimed in claim 9 wherein:
said indicator member is provided with means for indicating that said device has reached a temperature other than said predetermined temperature, said temperature indicating means being located so as to be visible through said window means when said indicator member is engaged by said spring means so as to hold said indicator member so that it is visible through said window means.

12. A temperature indicating device as claimed in claim 11 including:
a pin extending into said cavity from the exterior of said housing so as to engage said spring means in order to physically prevent said spring means from changing from said first configuration to said second configuration, said pin being capable of being physically removed from said housing so as to permit said spring means to change in configuration.

* * * * *